(12) United States Patent
Orlandi

(10) Patent No.: US 6,437,730 B1
(45) Date of Patent: Aug. 20, 2002

(54) METHOD FOR CHECKING AN FM/CW TYPE RADIO ALTIMETER, AND RADIO ALTIMETER DESIGNED FOR THE IMPLEMENTATION OF THIS METHOD

(75) Inventor: Fabrice Orlandi, Massy (FR)

(73) Assignee: Thomson-CSF, Paris (FR)

( * ) Notice: Subject to any disclaimer, the term of this patent is extended or adjusted under 35 U.S.C. 154(b) by 92 days.

(21) Appl. No.: 09/706,761

(22) Filed: Nov. 7, 2000

(30) Foreign Application Priority Data

Nov. 10, 1999 (FR) .............................................. 99 14138

(51) Int. Cl.$^7$ ............................................. G01S 13/32
(52) U.S. Cl. ...................... 342/122; 342/165; 342/173; 342/192; 342/196
(58) Field of Search .............................. 342/120, 121, 342/122, 165, 173, 174, 192, 193, 195, 196

(56) References Cited

U.S. PATENT DOCUMENTS

| 3,860,925 A | * | 1/1975 | Darboven, Jr. ............... 342/109 |
| 4,115,774 A | * | 9/1978 | Tresselt ....................... 342/174 |
| 4,282,524 A | * | 8/1981 | Eymann et al. ............... 342/122 |
| 4,427,981 A | * | 1/1984 | Kyriakos ...................... 342/122 |
| 4,503,401 A | * | 3/1985 | Kyriakos et al. ............... 331/4 |
| 4,509,049 A | * | 4/1985 | Haendel et al. ................ 342/87 |
| 4,539,565 A | * | 9/1985 | Norsworthy ................. 342/128 |
| 4,568,938 A | * | 2/1986 | Ubriaco ........................ 342/87 |
| 4,599,618 A | * | 7/1986 | Haendel et al. ................ 342/87 |
| 4,825,214 A | * | 4/1989 | Dejaegher .................... 342/128 |
| 4,945,360 A | * | 7/1990 | Trummer et al. ............ 342/122 |
| 5,016,016 A | * | 5/1991 | Strauch ........................ 342/87 |
| 5,614,911 A | | 3/1997 | Otto et al. ................... 342/124 |

FOREIGN PATENT DOCUMENTS

| DE | 197 44 731 | 5/1999 |
| EP | 0 667 536 | 8/1995 |
| EP | 0 762 541 | 3/1997 |
| FR | 2 750 766 | 1/1998 |

* cited by examiner

Primary Examiner—John B. Sotomayor
(74) Attorney, Agent, or Firm—Oblon, Spivak, McClelland, Maier & Neustadt, P.C.

(57) ABSTRACT

A radio altimeter using a linear oscillator to send out a continuous wave that is frequency modulated linearly between two boundary values sends the antenna installation an incident signal, collects the signal reflected by the installation and examines it. This incident signal may be that of the linear oscillator. For the reception antenna installation, this means providing for a rerouting in order to direct a small part of the signal of the oscillator to this installation. In the case of the transmission antenna installation it is enough to provide for a rerouting that injects the signal reflected by this installation into the reception channel. Application to all the FM/CW radio altimeters.

8 Claims, 3 Drawing Sheets

METHOD FOR CHECKING AN FM/CW TYPE RADIO ALTIMETER, AND RADIO ALTIMETER DESIGNED FOR THE IMPLEMENTATION OF THIS METHOD

BACKGROUND OF THE INVENTION

1. Field of the Invention

The invention relates to FM/CW or "frequency modulation/continuous wave" type radio altimeters. These radio altimeters send out a continuous wave that is frequency modulated linearly between two boundary values. That is to say, it is a saw-toothed wave. When this wave is received by the radio altimeter after having been reflected off the ground, it has a delay of 2h/c with respect to the wave sent, where h is the height of the radio altimeter from the ground and c is the speed of light. Since the modulation is linear, this delay is proportional to the beat frequency, f, obtained by mixing the transmission signal and the reception signal. If the difference dF between the two boundary values and the time Td taken by the modulation to go from one boundary value to the other are known, then the height h can be calculated by the formula:

$$h = Td.f.c/2.dF$$

In reality, the mixing of the transmitted and received waves does not give the beat frequency. It gives an entire spectrum of frequencies from which it is possible, using different processing methods, to extract the frequency representing the height to be measured. Such a method is described, for example, in the French patent No. 2 750 766.

2. Description of the Prior Art

However, in these prior art radio altimeters, there is no way, apart from using testing stands, to monitor and check the quality of the transmission and reception antenna installations connected respectively to the transmission and reception receiver ports of the radio altimeter. Now, such an assessment would be very useful, especially in order to be informed of deterioration, as soon as it occurs, in an antenna installation or to take account more easily of parasitic echoes on obstacles linked to the radio altimeter.

The present invention is aimed at overcoming this lack of information on the state of the antenna installations, i.e. not only on the transmission and reception antennas and their connection cable but also on everything that surrounds them and affects, in varying degrees, the beat signal obtained by the mixing of the transmission and reception signals.

This result is obtained through the transmission, by means of the radio altimeter, of an incident signal to the installation to be checked and by studying the wave reflected by the installation concerned.

SUMMARY OF THE INVENTION

According to the invention, there is proposed, to this end, a method of checking designed for an FM/CW type radio altimeter having a transmission port and a reception port to which there are respectively connected a transmission antenna installation and a reception antenna installation, the radio altimeter comprising a linear oscillator to give a saw-toothed signal with a link to the transmission port, a mixing circuit with two links, respectively to the oscillator and the reception port, and a processing unit to process the output signals from the mixing circuit wherein, to check at least one of the two installations, the method consists of the transmission, from the radio altimeter to the installation to be checked, of an incident signal and the examination, in the processing circuit, of the signals reflected by this installation to be checked, this examination pertaining to the position and the amplitude of the lines of the spectrum of the signal given by the mixing circuit.

There is also proposed an FM/CW type radio altimeter comprising firstly, in series, a control unit, a linear oscillator and first coupling elements for the coupling of the oscillator to a transmission antenna installation and, secondly, a mixing circuit with a first input coupled to the linear oscillator and a second input, second coupling elements to couple a reception antenna installation to the second input of the mixing circuit and a processing unit to process the output signals of the mixing circuit wherein, to check one of the installations, it comprises first means to send an incident signal to the installation and second means to collect the signals received by the installation to be checked in response to the transmission of the incident signal and to send them to the second input of the mixing circuit.

BRIEF DESCRIPTION OF THE DRAWINGS

The present invention will be understood more clearly and other features shall appear from the following description and the figures pertaining thereto. Of these figures:

In FIGS. 1, 3, 4 and 5, the corresponding elements are designated by the same references.

MORE DETAILED DESCRIPTION

Figure 1:
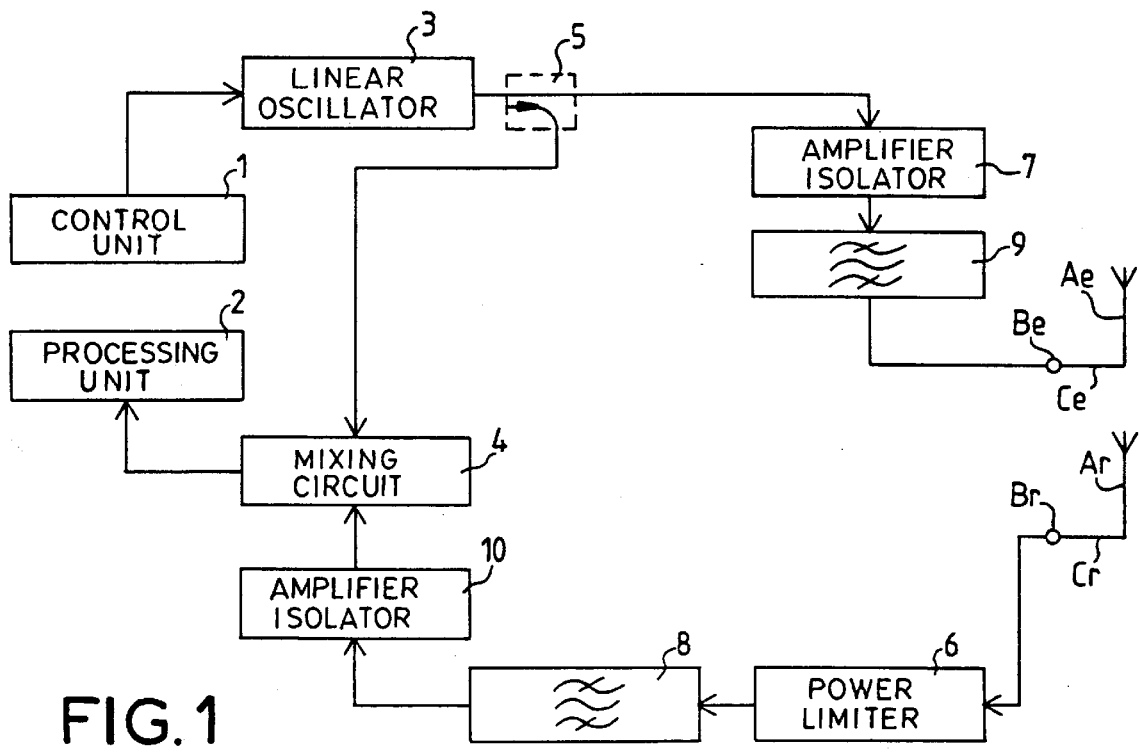
FIG. 1 shows a radio altimeter according to the prior art.

FIG. 1 shows a radio altimeter according to the prior art. This radio altimeter has a control unit 1 and a processing unit 2 whose functions are carried out by means of a microprocessor. The control unit 1 controls a linear oscillator 3 whose output signal is given by a directional coupler 5 which, in the example described, is a 20 dB coupler. The coupler 5 sends on the major portion of the energy that it receives to a transmission port Be, through an amplifier-isolator 7 followed by a passband filter 9 and the remaining energy that it receives to the first input of a mixing circuit 4 whose output signals are given to the processing unit 2. A cable Cr connects a transmission antenna Ae to the port Be.

The radio altimeter according to FIG. 1 also has a reception port Br that a cable Cr connects to a reception antenna Ar and, series-connected between the port Br and the second input of the mixing circuit 4, a power limiter 6, a bandpass filter 8 and an amplifier-isolator 10.

In the case of the example described with reference to FIG. 1, as in the case of the examples to be described by means of FIGS. 3 to 5, the linear oscillator is activated to give a signal whose frequency varies in a saw-toothed profile between a value F1 and a value F2, with a plateau at the low frequency F1.

Figure 2:
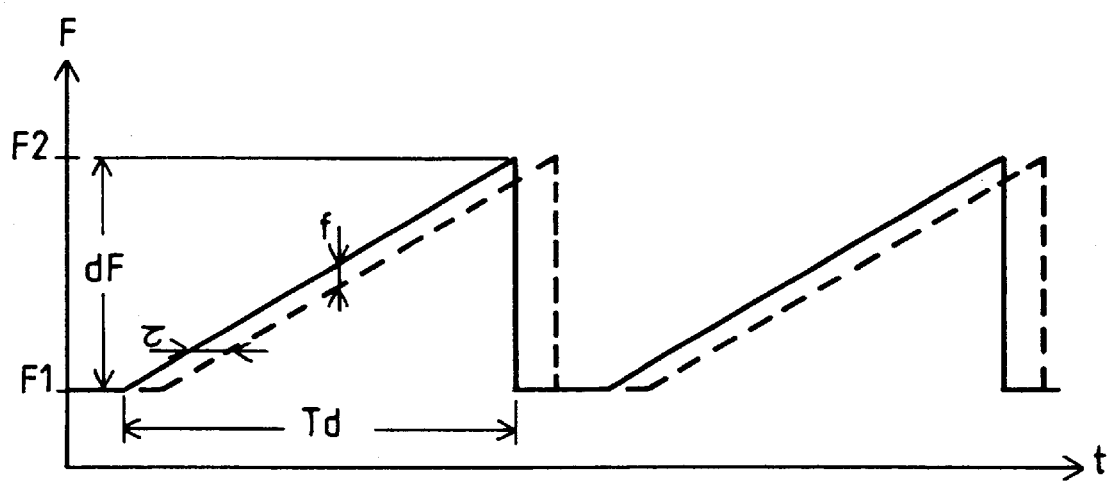
FIG. 2 is a graph pertaining to the waves transmitted and received by the radio altimeters that are described in this document.

FIG. 2 is a graph with an unbroken line depicting the variation in time of the frequency of the wave sent by the radio altimeter of FIG. 1 and a line of dashes depicting the variation in time of the frequency of the wave reflected by the ground and received by the reception antenna Ar; the second curve corresponds to the first but is offset by the time τ taken by the wave to make a to-and-fro journey with reflection on the ground. As indicated at the beginning of this document, the height h measured by the radio altimeter is given by the formula $h = Td.f.c/2.dF$ the variables Td, f and dF are identified in FIG. 2: Td duration of a sawtooth, f beat frequency between the wave transmitted and the wave reflected by the ground, dF width of the frequency band travelled through by the sawteeth.

With a radio altimeter like that of FIG. 1, there is nothing planned to check the quality of the transmission antenna installation Ce, Ae and/or the reception antenna installation; now these installations have imperfections, even defects which, in the spectrum of the signal given by the mixing circuit 4, add parasitic lines to the line that is produced by the beat between the wave transmitted and the wave reflected by the ground vertically to the radio altimeter.

Figure 3:
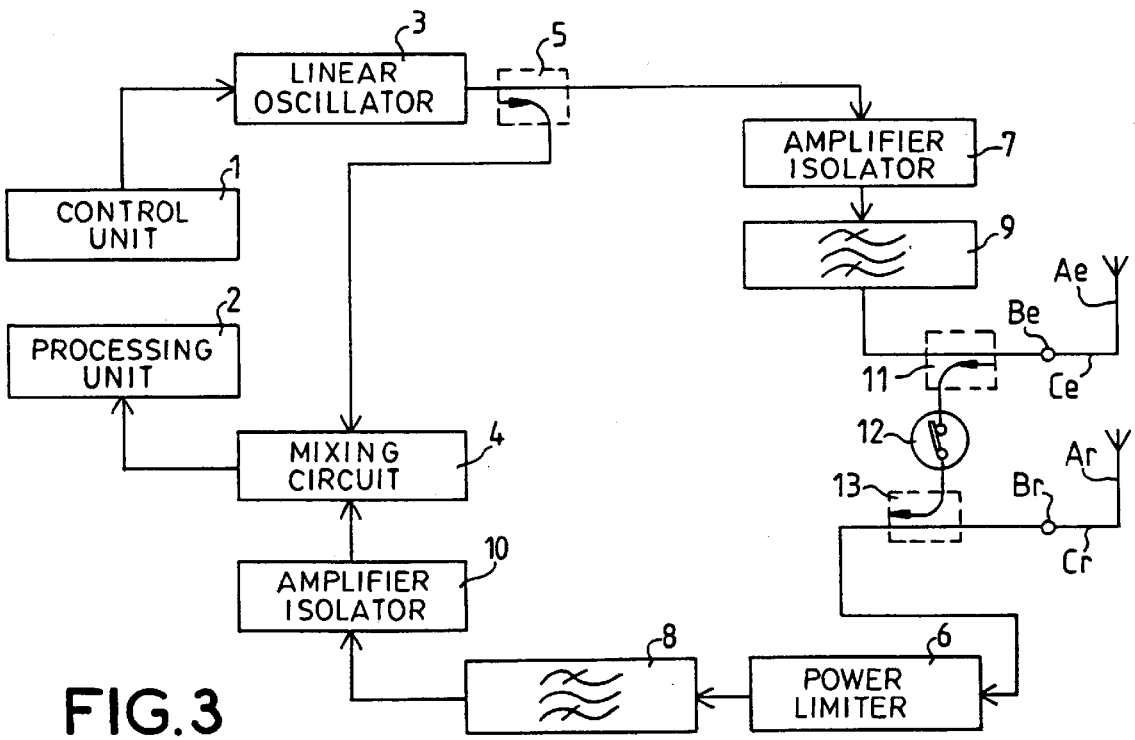
FIGS. 3 to 5 show radio altimeters according to the invention.

FIG. 3 shows the way to modify the radio altimeter of FIG. 1 in order to monitor and check the quality of the transmission antenna installation. A directional coupler 11 is inserted in the link between the filter 9 and the port Be it is connected, through a switch 12, to another directional coupler 13 inserted between the port Br and the power limiter 6.

When the switch 12 is closed, the major part of the energy reflected by the transmission antenna installation is diverted from the transmission channel to be sent, on the reception channel, to the second input of the mixing circuit. With the lines that this diverted energy introduces into the spectrum of the beat signal delivered by the output of the mixing circuit 4, the processing unit 2 measures the reflection coefficient of the transmission antenna installation as well as the microwave loss in the cable Ce. Through closures of the switch 12, the processing unit can thus, at any time, check the state of the transmission antenna installation and, in particular, activate an alarm when the results of the measurements become abnormal as a consequence, for example, of accidental deterioration of the cable Ce or the antenna Ae.

These measurements of reflection coefficients and microwave losses are standard measurements. It is therefore not necessary to specify the way to do them. However, it must be noted that the linear oscillator, while preserving a constant width dF for the frequency band travelled by the sawteeth, is programmed to have sawtooth durations Td such that the beat frequencies due to the reflected waves in the transmission channel take place within the band of frequencies in which the processing unit makes its measurement. In the example described, this band stretches from 40 to 110 kHz and the beat frequencies are taken to 85 kHz. For this type of operation, the slope dF/Td of the sawtooth is gradually modified by causing Td to vary, and thus the different beat frequencies due to the transmission channel occur one after the other at 85 kHz where they are studied. Of course, the beat frequencies to be considered in this study of the quality of the transmission antenna installation are those pertaining to very small distances, ranging from some centimeters to some meters, corresponding to the transmission channel and to the immediate surroundings of the transmission channel.

Figure 4:
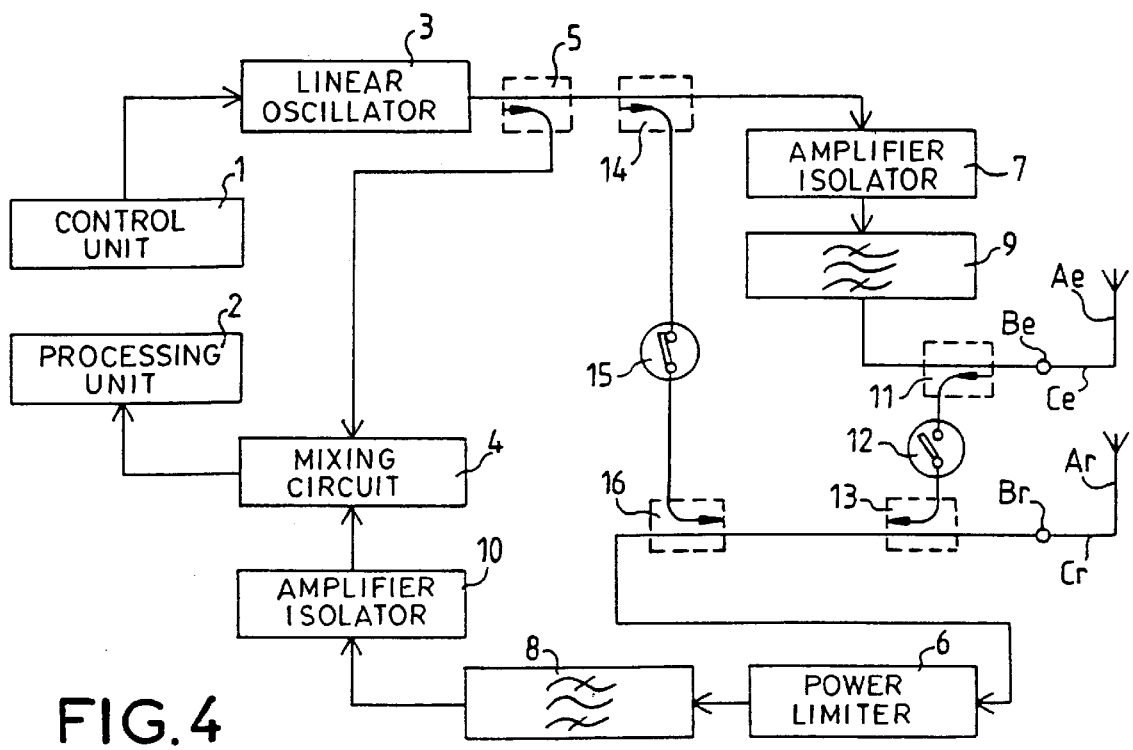
Figure 5:
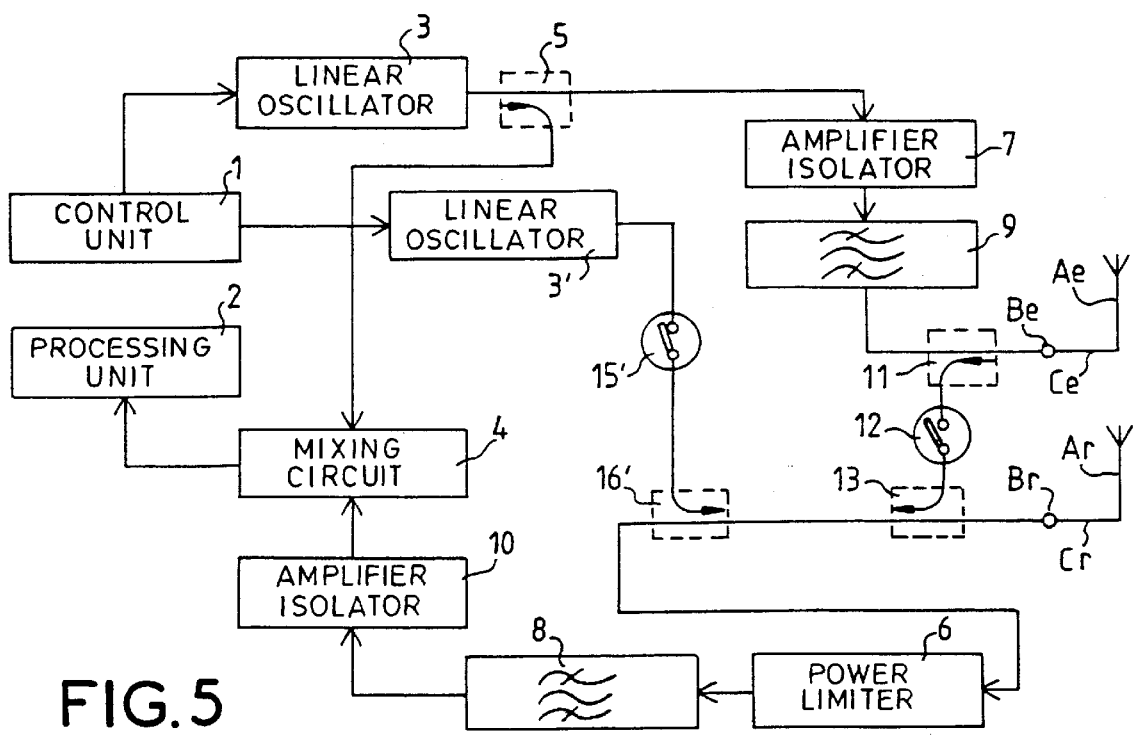

FIGS. 4 and 5 show two different ways of adding a system for monitoring and checking the quality of the reception antenna installation to the radio altimeter according to FIG. 3.

In the case of FIG. 4 a first directional coupler, 14, is inserted into the link between the coupler 5 and the amplifier-isolator 7; This first coupler is connected, through a switch 15, to a second coupler, 16, inserted in the link between the coupler 13 and the power limiter 6. The coupler 14 diverts a very small part of the energy that it receives from the oscillator 3 to the coupler 16, and the coupler 16 sends the major part of this diverted energy to the reception antenna Ar. As in the case of the quality check on the transmission antenna installation, the examination relates to the beat frequencies which cover very small distances corresponding to reflections in the reflection channel or in the immediate neighborhood of the reception channels.

In the case of FIG. 5 the check on the quality of the reception antenna installation is done by the addition, to the radio altimeter according to FIG. 3, of an auxiliary linear oscillator, 3', controlled by the control element, and a switch 15' followed by a directional coupler 16'. The coupler 16' is inserted between the coupler 13 and the power limiter 6. When the switch 15' is closed, the coupler 16' sends the major part of the energy from the oscillator 3' to the reception antenna installation. Here the check is therefore done by the injection, into the reception antenna channel, towards the reception antenna, of a signal produced by the auxiliary oscillator and by studying the beat frequencies at the output of the mixing circuit. The signal produced by the auxiliary oscillator 3' must reproduce, in synchronism, the sawteeth of the main oscillator 3.

It must be noted that the three antenna installation checking operations that have just been described with reference to FIGS. 3 to 5 work in the same way: the sending of an incident signal to the installation to be checked and the study of the beat frequencies at the output of the mixing circuit. The three checks are differentiated from each other by the installations checked and/or the nature of the incident signal: the checking of the transmission antenna installation according to FIG. 3 and that of the reception antenna installation according to FIGS. 4 and 5, the use, as an incident signal, of the signal from the linear oscillator of the transmission channel according to FIGS. 3 and 4, and of the signal of an auxiliary linear oscillator according to FIG. 5.

The present invention is not limited to the examples described. Thus, especially, no reference has been made to the activation of the checks. This activation can be done by an operator and/or automatically. In both cases, the processing unit is informed of the check to be made and closes the switch used for this check. As for the automatic checks, they can be activated systematically, for example when the radio altimeter is turned on, or periodically. Similarly, the processing unit can activate a sound or light alarm as soon as a check on an antenna installation reveals an anomaly.

It must also be noted that if a radio altimeter can be fitted out with only one transmission antenna installation checking system as illustrated by FIG. 3. It can also be fitted out with only one reception antenna installation system. In FIGS. 4 and 5, this means eliminating the switch 12 and then replacing the couplers 11 and 13 by short-circuits.

What is claimed is:

1. A method of checking designed for an FM/CW type radio altimeter having a transmission port and a reception port to which there are respectively connected a transmission antenna installation and a reception antenna installation, the radio altimeter comprising a linear oscillator to give a saw-toothed signal, with a link to the transmission port, a mixing circuit with two links, respectively to the oscillator and the reception port, and a processing unit to process the output signals from the mixing circuit wherein, to check at least one of the two installations, the method consists of the transmission, from the radio altimeter to the installation to be checked, of an incident signal and the examination, in the processing circuit, of the signals reflected by this installation to be checked, this examination pertaining to the position and the amplitude of the lines of the spectrum of the signal given by the mixing circuit.

2. A method according to claim 1 wherein, to check the transmission antenna installation, the method consists in using the saw-toothed signal as the incident signal, diverting a part of the signal reflected by the transmission antenna installation to send it to the mixing circuit in introducing it into the link between the reception port and the mixing circuit.

3. A method according to claim 1 wherein, to check the reception antenna installation, it consists in diverting a part of the saw-toothed signal in order to use it for the incident signal and in sending a part of the signal thus diverted to the reception antenna installation by introducing it into the link between the mixing circuit and the reception port.

4. A method according to claim 1 wherein, to check the reception antenna installation, it consists in using, in order to give the incident signal, of an auxiliary oscillator to deliver a signal similar to, and in synchronism with, the signal of the linear oscillator, in sending the signal of the auxiliary oscillator to the reception antenna installation by introducing it into the link between the mixing circuit and the reception port.

5. A FM/CW type radio altimeter comprising firstly, in series, a control unit, a linear oscillator and first coupling elements to couple the oscillator to a transmission antenna installation and, secondly, a mixing circuit with a first input coupled to the linear oscillator and a second input, second coupling elements to couple a reception antenna installation to the second input of the mixing circuit and a processing unit to process the output signals from the mixing circuit wherein, to monitor and check one of the installations, it comprises first means to send an incident signal to the installation to be checked and second means to collect the signals received by the installation to be checked in response to the transmission of the incident signal and to send them to the second input of the mixing circuit.

6. A radio altimeter according to claim 5 wherein, since the installation to be checked is that of the transmission antenna, the first means comprise the linear oscillator and the first coupling elements and the second means comprise a first and second directional coupler connected by a switch, the first coupler being interposed between the first elements and the transmission antenna installation and the second coupler being interposed between the reception antenna installation and the second elements and wherein the two couplers are connected so that, when the switch is closed, it diverts the major part of the energy reflected by the transmission antenna installation to the second elements.

7. A radio altimeter according to claim 5 wherein, since the antenna to be checked is that of the reception antenna, the first means comprise a first and second directional coupler connected by a switch, the first coupler being interposed between the oscillator and the first elements and the second coupler between the reception antenna installation and the second elements and wherein the two couplers are connected in order that, when the switch is closed, they divert a small part of the energy delivered by the oscillator to the reception antenna installation.

8. A radio altimeter according to claim 5 wherein, since the installation to be checked is that of the reception antenna, the first means comprise an auxiliary linear oscillator and a directional coupler connected by a switch, the auxiliary linear oscillator being controlled by the control unit and the coupler being interposed between the reception antenna installation and the second elements and wherein the coupler is connected so that, when the switch is closed, it directs the major part of the energy given by the auxiliary linear oscillator to the reception antenna installation.

* * * * *